United States Patent [19]

Kress et al.

[11] Patent Number: 4,983,658
[45] Date of Patent: * Jan. 8, 1991

[54] THERMOPLASTIC MOULDING COMPOSITIONS WITH FLAME-REPELLENT PROPERTIES

[75] Inventors: Hans-Jürgen Kress; Heremann Kauth, both of Krefeld; Horst Peters, Leverkusen; Christian Lindner, Cologne; Friedemann Müller, Neuss, all of Fed. Rep. of Germany

[73] Assignee: Bayer Aktiengesellschaft, Leverkusen-Bayerwerk, Fed. Rep. of Germany

[ * ] Notice: The portion of the term of this patent subsequent to Jun. 14, 2005 has been disclaimed.

[21] Appl. No.: 329,201

[22] Filed: Mar. 27, 1989

Related U.S. Application Data

[63] Continuation of Ser. No. 913,336, Sep. 30, 1986, abandoned, which is a continuation of Ser. No. 762,941, Aug. 6, 1985, abandoned.

[30] Foreign Application Priority Data

Aug. 17, 1984 [DE] Fed. Rep. of Germany ....... 3430235
Oct. 3, 1984 [DE] Fed. Rep. of Germany ....... 3436162
Apr. 6, 1985 [DE] Fed. Rep. of Germany ....... 3512638

[51] Int. Cl.$^5$ .......................... C08K 5/52; C08K 5/53
[52] U.S. Cl. ..................... 524/141; 524/143; 525/67; 525/146
[58] Field of Search .................. 524/141, 143; 525/67, 525/146

[56] References Cited

U.S. PATENT DOCUMENTS

| | | | |
|---|---|---|---|
| 3,189,662 | 6/1965 | Vaughn | 528/29 |
| 3,294,871 | 12/1966 | Schmitt et al. | 525/146 |
| 3,419,634 | 12/1968 | Vaughn | 528/29 |
| 3,852,394 | 12/1974 | Kubota et al. | 524/112 |
| 3,879,345 | 4/1975 | Furakawa et al. | 524/141 |
| 4,178,281 | 12/1979 | Horn | 524/120 |
| 4,204,047 | 5/1980 | Margotte | 525/67 |
| 4,205,141 | 5/1980 | Liebig et al. | 525/67 |
| 4,208,489 | 6/1980 | Schmidt et al. | 524/413 |
| 4,223,100 | 9/1980 | Reinert et al. | 524/413 |
| 4,248,976 | 2/1981 | Clubley | 524/141 |
| 4,391,935 | 7/1983 | Bialous et al. | 524/160 |
| 4,463,130 | 7/1984 | Serini et al. | 525/67 |
| 4,649,168 | 3/1987 | Kress et al. | 524/132 |
| 4,692,488 | 9/1987 | Kress et al. | 524/141 |
| 4,721,774 | 1/1988 | Todtemann et al. | 524/141 |
| 4,751,260 | 6/1988 | Kress et al. | 524/141 |
| 4,766,165 | 8/1988 | Kress et al. | 524/141 |
| 4,788,238 | 11/1988 | Todtemann et al. | 524/141 |

FOREIGN PATENT DOCUMENTS

| | | |
|---|---|---|
| 0103230 | 3/1984 | European Pat. Off. . |
| 0115885 | 8/1984 | European Pat. Off. . |
| 2264104 | 7/1973 | Fed. Rep. of Germany . |
| 2921325 | 12/1979 | Fed. Rep. of Germany . |
| 2918883 | 11/1980 | Fed. Rep. of Germany . |
| 3130774 | 2/1983 | Fed. Rep. of Germany . |
| 3322260 | 1/1985 | Fed. Rep. of Germany . |
| 50-51154 | 5/1975 | Japan . |

Primary Examiner—Veronica P. Hoke
Attorney, Agent, or Firm—Connolly and Hutz

[57] ABSTRACT

The present invention relates to thermoplastic moulding compositions which are provided with a flame-repellent finish by adding phosph(on)ate esters, tetrafluoroethylene polymers and, if appropriate, halogen compounds.

2 Claims, No Drawings

THERMOPLASTIC MOULDING COMPOSITIONS WITH FLAME-REPELLENT PROPERTIES

This is a continuation of application Ser. No. 913,336 filed Sept. 30, 1986 which in turn is a continuation of application Ser. No. 762,941 filed Aug. 6, 1985, all now abandoned.

The present invention relates to thermoplastic moulding compositions consisting of (A) 20 to 85 parts by weight of a thermoplastic aromatic polycarbonate, (B) 5 to 50 parts by weight of a graft polymer of
  (B)(1) 5 to 90 parts by weight, preferably 30 to 80 parts by weight, of a mixture of
    (B)(1)(1) 50 to 95% by weight of styrene, α-methylstyrene, nuclear-substituted styrene, methyl methacrylate or mixtures thereof and
    (B)(1)(2) 50 to 5% by weight of (meth)acrylonitrile, methyl methacrylate, maleic anhydride, N-substituted maleimide or mixtures thereof, on
  (B)(2) 95 to 10 parts by weight, preferably 70 to 20 parts by weight, of a rubber with a glass transition temperature $T_G \leq 10°$ C., (C) 5 to 70 parts by weight of a thermoplastic copolymer of
  (C)(1) 50 to 95% by weight of styrene, α-methylstyrene, nuclear-substituted styrene, methyl methacrylate or mixtures thereof and
  (C)(2) 50 to 5% by weight of (meth)acrylonitrile, methyl methacrylate, maleic anhydride, N-substituted maleimide or mixtures thereof, and, if appropriate, (D) 3 to 15 parts by weight of a low molecular weight or high molecular weight halogen compound, in particular a bromine compound, based on in each case 100 parts by weight of A+B+C and, if appropriate, (D), wherein the halogen content resulting from components (A)+(D) should in each case be between 3% by weight and 10% by weight, based on the total weight of components (A)+(D), which are characterised in that they additionally contain (E) 1 to 15 parts by weight, preferably 2 to 12 parts by weight, of a phosphorus compound of the formula (I)

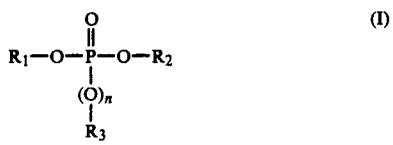

wherein
  $R_1$, $R_2$ and $R_3$ independently of one another are optionally halogenated $C_1$-$C_8$-alkyl or optionally halogenated $C_6$-$C_{20}$-aryl and
  "n" is 0 or 1, and (F) 0.05 to 1 part by weight, in particular 0.1 to 0.5 part by weight, of a tetrafluoroethylene polymer with an average particle size of 0.05 to 20 μm and a density of 1.2 to 1.9 g/cm³, the parts by weight of components (E) and (F) in each case being based on 100 parts by weight of the sum of components (A)+(B)+(C) and, if appropriate, (D), and component (F) being employed in the form of a coagulated mixture of emulsions of the tetrafluoroethylene polymers (F) with emulsions of additional amounts of graft polymers (B) of not more than 4 parts by weight, but at least 0.1 part by weight, relative to 100 parts by weight of the sum f components (A)+(B)+(C) and, if appropriate, (D).

Thermoplastic aromatic polycarbonates of component (A) which are suitable according to the invention are those based on the diphenols of the formula (II)

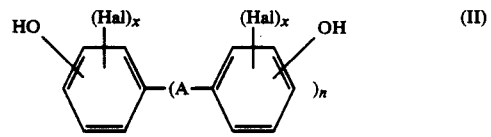

wherein
  A is a single bond, $C_1$-$C_5$-alkylene, $C_2$-$C_5$-alkylidene, $C_5$-$C_6$-cycloalkylidene, —S— or —SO$_2$—, Hal is chlorine or bromine,
  x is 0, 1 or 2 and
  "n" is 1 or zero,
or of the formula (IIa)

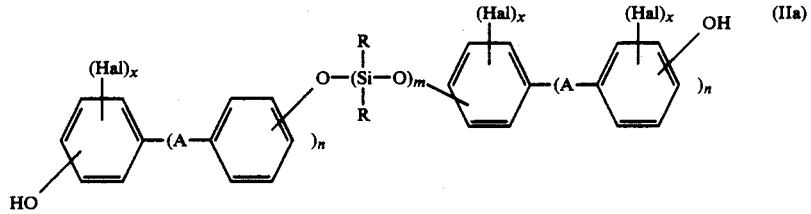

wherein
  A, Hal, x and "n" have the meaning given in the case of formula (II),
  the symbols R are identical or different and are linear $C_1$-$C_{20}$-alkyl, branched $C_3$-$C_{20}$-alkyl or $C_6$-$C_{20}$-aryl, preferably CH$_3$, and
  "m" is an integer between 5 and 100, preferably between 20 and 80.

Polycarbonates of component (A) which are suitable according to the invention are either homopolycarbonates or copolycarbonates, the diphenols of the formula (IIa) being employed only for the preparation of copolycarbonates with the diphenols of the formula (II), and the weight content of diphenols of the formula (IIa) in the copolycarbonates in each case being between 1 and 20% by weight, preferably between 1.5 and 15% by weight and in particular between 2 and 10% by weight, in each case based on the total weight of the diphenols of the formulae (II) and (IIa) employed.

The diphenols of the formula (II) are either known from the literature or can be prepared by processes which are known from the literature; polydiorganosiloxanes with hydroxy-aryloxy end groups according to formula (IIa) are likewise known (see, for example, U.S. Pat. No. 3,419,634), or can be prepared by processes which are known from the literature.

The preparation of the polycarbonates of component (A) which are suitable according to the invention is known from the literature and can be carried out, for example, with phosgene by the phase boundary process or with phosgene by the homogeneous phase process (the so-called pyridine process), the particular molecular weight to be established being achieved in a known manner by a corresponding amount of known chain stoppers. (Regarding polydiorganosiloxane-containing polycarbonates, see, for example, DE-OS (German Published Specification) No. 3,334,872 (Le A 22 594).

Examples of suitable chain stoppers are phenol, p-chlorophenol, p-tert.-butylphenol and 2,4,6-tribromophenol, as well as long-chain alkylphenols, such as 4-(1,3-tetramethyl-butyl)-phenol and 4-(3,5-dimethylheptyl)-phenol according to DE-OS (German Published Specification) No. 2,842,003 (Le A 19 006) or monoalkylphenols or dialkylphenols having a total of 8 to 20 C atoms in the alkyl substituents, according to German Patent Application P No. 3 506 472.2 (Le A 23 654), such as p-isooctylphenol, p-nonylphenol, 3,5-di-tert.-butylphenol, p-tert.-octyl-phenol, p-dodecyl-phenol and 2-(3,5-dimethylheptyl)-phenol. The polycarbonates according to component (A) which are suitable according to the invention have mean weight average molecular weights ($\overline{M}w$, measured by, for example, ultracentrifuging or light scattering) of 10,000 to 200,000, preferably of 20,000 to 80,000.

Examples of suitable diphenols of the formula (II) are hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Preferred diphenols of the formula (II) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Suitable diphenols of the formula (IIa) are those in which R is methyl, ethyl, propyl, n-butyl, tert.-butyl, phenyl or naphthyl.

Preferred diphenols of the formula (IIa) are those of the formula (IIb)

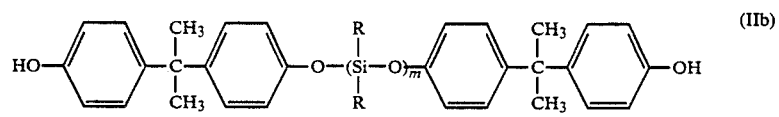

wherein
  the symbols R are identical and have the abovementioned meaning, that is to say denote methyl and the like or naphthyl, and
  m again is an integer between 5 and 100, preferably between 20 and 80.

The diphenols of the formula (IIa) can be prepared, for example, from the corresponding bis-chlorine compounds (III)

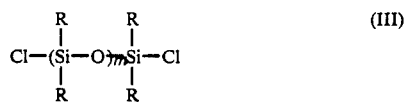

and the diphenols (II), for example in accordance with U.S. Pat. No. 3,419,634, column 3, in combination with U.S. Pat. No. 3,189,662.

In the bis-chlorine compounds (III), R and m have the meaning as in the diphenols (IIa) or (IIb).

The polycarbonates of component (A) which are suitable according to the invention can be branched in a known manner, and in particular preferably by incorporating 0.05 to 2.0 mol %, based on the sum of diphenols employed, of compounds which are trifunctional or more than trifunctional, for example those with three or more than three phenolic OH groups.

Besides bisphenol A homopolycarbonate, preferred polycarbonates are copolycarbonates of bisphenol A with up to 15 mol %, based on the total moles of diphenols, of 2,2-bis-(3,5-dibromo-4-hydroxyphenyl)-propane or the copolycarbonates of the diphenols of the formula (II) with 1 to 20% by weight of diphenols of the formula (IIa), preferably of the formula (IIb); in each case based on the total weight of the diphenols (II) and (IIa) or (II) and (IIb).

Rubbers which are suitable for the preparation of the graft polymers according to component (B) are, in particular, polybutadiene and butadiene/styrene copolymers with up to 30% by weight, based on the weight of rubber, of a lower alkyl ester of acrylic or methacrylic acid (for example methyl methacrylate, ethyl acrylate, methyl acrylate or ethyl methacrylate). Examples of other suitable rubbers are polyisoprene or polychloroprene. Further suitable rubbers are alkyl acrylate rubbers based on $C_1$–$C_8$-alkyl acrylates, in particular ethyl, butyl and ethylhexyl acrylate. If appropriate, these alkyl acrylate rubbers can contain up to 30% by weight, based on the weight of the rubber, of copolymerised units of monomers such as vinyl acetate, acrylonitrile, styrene, methyl methacrylate and/or vinyl ether. These alkyl acrylate rubbers can furthermore contain relatively small amounts, preferably up to 5% by weight, based on the weight of the rubber, of ethylenically unsaturated monomers with a crosslinking action. Examples of such crosslinking agents are alkylenedioldi(-meth)-acrylates, polyester di-(meth)-acrylate, divinylbenzene, tri-vinylbenzene, triallyl cyanurate, allyl(-meth)-acrylate, butadiene or isoprene. Such alkyl acrylates are known. Acrylate rubbers as the grafting base can also be products which contain, as the core, a crosslinked diene rubber of one or more conjugated dienes, such as polybutadiene, or a copolymer of a conjugated diene with an ethylenically unsaturated monomer, such as styrene and/or acrylonitrile. Other suitable rubbers are, for example, EPDM rubbers, that is to say rubbers of ethylene, propylene and a non-conjugated diene monomer.

Preferred rubbers for the preparation of the graft polymers (B) are diene monomer rubbers and alkyl acrylate rubbers.

The rubbers are present in the graft polymers (B) in the form of at least partially crosslinked particles with an average particle size of 0.09 to 5 μm, in particular 0.1 to 1 μm. The graft polymers (B) are prepared by free radical grafting copolymerisation of the monomer mixtures, defined above, of (B)(1)(1) and (B)(1)(2) in the presence of the rubbers (B)(2) to be grafted and are widely known. Preferred preparation processes for the graft polymers (B) are emulsion, solution, bulk or suspension polymerisation. Particularly preferred graft polymers (B) are the so-called ABS polymers. Halogenostyrenes and p-methylstyrene may be mentioned as nuclear-substituted styrenes.

Preferred copolymers according to component (C) are those of at least one monomer from the series comprising styrene, α-methylstyrene and halogenostyrene, according to (C)(1), with at least one monomer from the series comprising acrylonitrile, methacrylonitrile, methyl methacrylate and maleic anhydride, according to (C)(2).

Copolymers according to component (C) are frequently formed as by-products during grafting polymerisation to prepare component (B), especially if large amounts of monomers are grafted onto small amounts of rubber.

The amount of copolymer (C) to be employed according to the invention, of 5 to 70 parts by weight, based on 100 parts by weight of (A)+(B)+(C) and, if appropriate, (D), does not include these by-products of the grafting polymerisation.

The copolymers according to component (C) are resinous, thermoplastic and rubber-free. Particularly preferred copolymers (C) are those of styrene with acrylonitrile and, if appropriate, with methyl methacrylate, of α-methylstyrene with acrylonitrile and, if appropriate, with methyl methacrylate, or of styrene and α-methylstyrene with acrylonitrile and, if appropriate, with methyl methacrylate.

Particularly preferred weight ratios in the thermoplastic copolymer (C) are 60 to 80% by weight of (C)(1) and 40 to 20% by weight of (C)(2).

The copolymers according to component (C) are known and can be prepared by free radical polymerisation, in particular by emulsion, suspension, solution or bulk polymerisation. The copolymers according to component (C) preferably have molecular weights $\overline{M}w$ (weight-average, determined by light scattering or sedimentation) of between 15,000 and 200,000.

Organic halogen compounds (D) which are suitable according to the invention are in principle all those which are not volatile and are heat-stable during the preparation and processing of the moulding compositions according to the invention, that is to say which do not thereby split off halogen and can thus exert their flame-proofing action in cases of fire. Compounds which are particularly suitable are decabromodiphenyl ether, octabromodiphenyl, octabromodiphenyl ether and tribromotetrachlorotoluene, and furthermore oligomeric bromine compounds, such as, for example, oligocarbonates based on tetrabromobisphenol A, and, finally, also polymeric bromine compounds, such as, for example, high molecular weight polycarbonates based on tetrabromobisphenol A or nuclear-brominated polyphenylene oxides.

The halogen content resulting from component (D) can thus also be introduced via the high molecular weight polycarbonate according to component (A).

The phosphorus compounds of component (E) to be employed according to the invention are generally known (see, for example, Ullmann, Enzyklopädie der technischen Chemie (Encyclopaedia of Industrial Chemistry), Volume 18, pages 301 et seq., 1979).

Optionally halogenated $C_1$–$C_8$-alkyl radicals according to $R_1$, $R_2$ or $R_3$ of the formula (I) are chloroethyl, 2-chloropropyl, 2,3-dibromopropyl, butyl, methyl and octyl.

Optionally halogenated $C_6$–$C_{20}$-aryl radicals according to $R_1$, $R_2$ or $R_3$ of the formula (I) are chlorophenyl, bromophenyl, pentachlorophenyl, pentabromophenyl, phenyl, cresyl, isopropylphenyl and naphthyl.

Phosphorus compounds of the formula (I) which can be employed according to the invention are tributyl phosphate, tris-(2-chloroethyl) phosphate, tris-(2,3-dibromopropyl) phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, halogen-substituted aryl phosphates, dimethyl methanephosphonate, diphenyl methanephosphonate and diethyl phenylphosphonate.

The tetrafluoroethylene polymers of component (F) which are suitable according to the invention are polymers with fluorine contents of 65 to 76% by weight, preferably 70 to 76% by weight. Examples are polytetrafluoroethylene, tetrafluoroethylene/hexafluoropropylene copolymers or tetrafluoroethylene copolymers with small amounts of fluorine-free copolymerisable ethylenically unsaturated monomers. The polymers are known. They can be prepared by known processes, thus, for example, by polymerisation of tetrafluoroethylene in an aqueous medium with a catalyst which forms free radicals, for example sodium peroxydisulphate, potassium peroxydisulphate or ammonium peroxydisulphate, under pressures of 7 to 71 kg/cm² and at temperatures of 0° to 200° C., preferably at temperatures of 20° to 100° C. (For further details, see, for example, U.S. Pat. No. 2,393,967).

The polytetrafluoroethylenes which are suitable according to the invention have average particle sizes of 0.05 to 20 μm, preferably 0.08 to 10 μm and a density of 1.2 to 1.9 g/cm³.

By adding tetrafluoroethylene polymers in particular, the dripping of the molten moulding composition during the burning process is reduced or completely prevented.

If the moulding compositions according to the invention are thus prepared, for example, from granules or powders of components (A) to (E) and a PTFE powder which has particle sizes and densities which are greater than those mentioned for the polytetrafluoroethylenes to be employed according to the invention, by melt compounding in kneaders or extruders, although moulding compositions with a high flame-repellancy are obtained, shaped articles produced therefrom sometimes have a defective surface, for example microcracks or waviness.

This is avoided with certainty if the very fine-particled and furthermore non-sintered tetrafluoroethylene polymers are employed in the form of a coagulated mixture of emulsions of the tetrafluoroethylene polymers (F) with emulsions of the graft polymers (B) and in addition not more than 4 parts by weight, but at least 0.1 part by weight, relative to 100 parts by weight of the sum of components (A)+(B)+(C) and, if appropriate, (D), of graft polymer (B) in the form of an emulsion is employed.

To prepare a corresponding mixture, an aqueous emulsion (latex) of a graft polymer (B) of average latex particle size of 0.1 to 2 μm, in particular 0.2 to 0.6 μm, is first mixed with a fine-particled emulsion of a tetrafluoroethylene polymer in water with an average particle size of 0.05-20 μm, in particular 0.08-10 μm; suitable tetrafluoroethylene polymer emulsions usually have solids contents of 30-70% by weight, in particular 50-60% by weight. The emulsions of the graft polymers (B) have solids contents of 25-50% by weight, preferably 30-45% by weight.

The weight ratio of graft polymer (B) to tetrafluoroethylene polymer (F) in the emulsion mixture is between 95:5 and 60:40. The emulsion mixture is then coagulated in a known manner, for example by spray-drying, freeze-drying or coagulation by adding inorganic or organic salts, acids or bases or organic water-miscible solvents, such as alcohols or ketones, preferably at temperatures of 20°-150° C., in particular 50°-100° C. If necessary, the product can be dried at 50°-200° C., preferably 70°-100° C.

Suitable tetrafluoroethylene polymer emulsions are commercially available products and are available, for example, from DuPont as Teflon ® 30 N.

According to DE-OS (German Published Specification) No. 2,228,072, thermoplastic polycarbonates are rendered flame-repellent with a mixture of hexabromobenzene and an antimony compound, and can additionally contain a phosphate ester as a synergist. However, the sole addition of 10 parts by weight of triphenyl phosphate to bisphenol A polycarbonate has no anti-drip action according to the ignition test U.L. Subj. 94 (see page 20 of DE-OS (German Published Specification) No. 2,228,072).

Foamable thermoplastics are known from DE-OS (German Published Specification) No. 2,434,085, polycarbonates, polymers or mixtures thereof, inter alia, being mentioned as thermoplastics. Polymers mentioned are also those of butadiene, styrene and acrylonitrile or of styrene by itself. The foamable plastics can contain phosphate esters, if appropriate in combination with halogen compounds, as flameproofing agents. No polytetrafluoroethylene polymers are recommended as halogen compounds.

Flame-repellent ABS polymers, inter alia, containing polytetrafluoroethylenes are known from U.S. Pat. Nos. 4,355,126 and 4,107,232. Triphenyl phosphate is the particularly preferred flameproofing agent. The additional co-use of polycarbonates does not yet lead a priori to the aim (see comparison experiment).

The addition of pentaerythritol diphosphates and diphosphonates as flameproofing agents for polycarbonates is described in DE-OS (German Published Specification) No. 2,921,325, and halogen compounds can additionally be co-used, it also being possible for these to be polyvinylidene fluorides according to page 9 of the DE-OS (German Published Specification) No. 2,921,325, from the U.S. Pat. No. 3,392,136 referred to. ABS copolymers can be admixed to the polycarbonates. However, since the phosphates or phosphonates of the general structure (I) do not produce a V0 in 1.6 mm when these are the sole additives to a PC/ABS mixture, the subject of the present invention could probably not be deduced from this literature reference.

Flame-repellent mixtures of polycarbonates, ABS polymers and halogen compounds are known from German Offenlegungsschriften (German Published Specifications) Nos. 2,903,100 and 2,918,883. According to DE-OS (German Published Specification) No. 2,903,100, the flame-repellancy is achieved by particular organic sulphonates. Fluorinated polyolefines can be added as drip-inhibiting agents. According to DE-OS (German Published Specification) No. 2,918,883, the flame-repellancy is achieved by alkali metal or alkaline earth metal salts of acids, in combination with anti-drip agents, the ABS polymers making up only a maximum of 10% by weight, based on the total mixture.

According to European Published Application No. 0,074,112, phosphate esters are added to polycarbonate/ABS mixtures as plasticisers. Diphenyl octyl phosphate is mentioned as an example of a phosphate ester. No addition of fluorinated polyolefines is described.

Flame-repellent polymer mixtures which, in addition to polytetrafluoroethylenes and organic halogen compounds, contain polyphosphates with $\overline{M}w$ of 1,600 to 150,000 in amounts of 1 to 35% by weight are also known (European Published Application No. 0,103,230). However, the polycarbonates of these moulding compositions are predominantly built up from tetramethylated diphenols. These moulding compositions thus have the disadvantage that they have a clearly lower level of mechanical properties than the present moulding compositions. The use of polyphosphates in PC/ABS moulding compositions based on a polycarbonate containing no alkylated diphenols also leads to no flameproofing action at all.

French Patent Specification No. 1,412,767 may also be referred to in respect of the difficult processing of polytetrafluoroethylenes, U.S. Pat. No. 3,294,871 may be referred to in respect of the incorporation of polytetrafluoroethylenes into thermoplastics, such as aromatic polycarbonates or polymers of unsaturated monomers, and U.S. Pat. No. 3,005,795, in particular columns 3/4, may also be referred to, where precipitation and coagulation are mentioned.

British Patent Specification No. 1,459,648 describes flame-repellent, non-dripping polymers, for example consisting of ABS polymers or of polycarbonates, with which a flameproofing additive, such as, for example, triphenyl phosphate, a non-combustible fibre material and polytetrafluoroethylene resin has been mixed. Example 2 of British Patent Specification No. 1,459,648 shows that polytetrafluoroethlene resin without added fibres does not prevent dripping.

DE-OS (German Published Specification) No. 3,322,260 (Le A 22 391) discloses flame-repellent thermoplastic moulding compositions which contain (a) aromatic polycarbonates, (b) SAN graft polymers, (c) thermoplastic polymers, (d) if appropriate halogen compounds, (e) antimony trioxide, antimony carbonate, bismuth trioxide or bismuth carbonate and (f) finely divided tetrafluoroethylene polymer, this being introduced into the moulding composition via an aqueous emulsion of the SAN graft polymer (b) and, if appropriate, an aqueous emulsion of the thermoplastic polymer (c), and good surfaces of the moulding compositions being achieved.

The moulding compositions according to the invention can contain other known additives, such as stabilisers, pigments, flow control agents, mould release agents and/or antistatics.

The moulding compositions according to the invention consisting of components (A), (B), (C), (E), (F) and, if appropriate, D and/or, if appropriate, other known additives, such as stabilisers, pigments, flow control agents, mould release agents and/or antistatics, are prepared by mixing the particular constituents in a known manner and subjecting the mixture to melt compounding or melt extrusion at temperatures of 200° C. to 330° C. in the customary units, such as internal kneaders, extruders or twin-screw extruders, component (F) again being employed only according to the invention, in the form of the coagulated mixtures already mentioned.

The present invention thus also relates to a process for the preparation of thermoplastic moulding compositions consisting of components (A), (B), (C), (E), (F) and, if appropriate, component (D), stabilisers, pigments, flow control agents, mould release agents and/or antistatics, which is characterised in that components (A), (B), (C), (E), (F) and, if appropriate, component (D), stabilisers, pigments, flow control agents, mould release agents and/or antistatics are subjected, after mixing, to melt compounding or melt extrusion at temperatures of 200° C. to 330° C. in the usual units, component (F) again only being employed in the form of a coagulated mixture with component (B).

The individual constituents can be mixed in a known manner, either successively or simultaneously, and in particular either at about 20° C. (room temperature) or at a higher temperature.

The moulding compositions of the present invention can be used to produce all types of shaped articles. In particular, shaped articles can be produced by injection-moulding. Examples of shaped articles which can be produced are: all types of housing components (for example for household appliances, such as juice presses, coffee machines and mixers) or covering slabs for the construction sector and components for the motor vehicle sector. They are also employed in the field of electrical engineering, because they have very good electrical properties.

Another form of processing is the preparation of shaped articles by deep-drawing from previously produced sheets or films.

Particle size always denotes the average particle diameter $d_{50}$, determined by ultracentrifuge measurements by the method of W. Scholtan et al., Kolloid-Z. u. Z. Polymere 250 (1972) 782–796.

EXAMPLES

POLYCONDENSATES AND POLYMERS EMPLOYED (A)(1) A copolycarbonate consisting of 90% by weight of bisphenol A and 10% by weight of tetrabromobisphenol A with a relative solution viscosity of 1.284, measured in $CH_2Cl_2$ at 25° C. and a concentration of 0.5% by weight. Bromine content 5% by weight.

(A)(2) A copolymer based on bisphenol A and 5% by weight of polydimethylsiloxane with a block length ($P_n$) of 40, with a relative solution viscosity of 1.31 (measured in $CH_2Cl_2$ at 25° C. and at a concentration of 0.5 g/100 ml).

(B) SAN graft polymer of 50% by weight of a styrene/acrylonitrile mixture (in a weight ratio of 72:28) on 50% of polybutadiene in particle form with an average particle size ($d_{50}$) of 0.4 μm, obtained by emulsion polymerisation.

(C) Styrene/acrylonitrile copolymer with a styrene/acrylonitrile ratio of 70:30 and a limiting viscosity of $[\eta]=0.55$ dl/g (measurement in dimethylformamide at 20° C.).

(E)(1) Diphenyl cresyl phosphate (E)(2) Diphenyl methanephosphonate (F)(1) Tetrafluoroethylene polymer as a coagulated mixture of an SAN graft polymer emulsion in water and a tetrafluoroethylene polymer emulsion in water. The weight ratio of graft polymer (B) to the tetrafluoroethylene polymer (F) in the mixture is 90% by weight: 10% by weight. The tetrafluoroethylene polymer emulsion has a solids content of 60%; the particle size is between 0.05 and 0.5 μm. The SAN graft polymer emulsion has a solids content of 34% by weight and had a later particle size of 0.3–0.4 μm.

Preparation of (F)(1): The emulsion of the tetrafluoroethylene polymer was mixed with the emulsion of the SAN graft polymer (B) and stabilised with 1.8% by weight, based on the polymer solids, of phenolic antioxidants. The mixture is coagulated with an aqueous solution of $MgSO_4$ (Epsom salt) and acetic acid at pH 4–5 at 85°–95° C., filtered and washed until virtually free from electrolytes, and is then freed from most of the water by centrifugation and subsequently dried to a powder at 100° C. This powder can then be compounded with the other components in the units described.

(F)(2) Tetrafluoroethylene polymer in powder form with a particle size of 500–650 μm and a density of 2.18–2.20 g/cm$^3$ from Hoechst (Hostaflon TF 2026), (D) Oligomeric polycarbonate of tetrabromobisphenol A with an average degree of polycondensation of 5.

PREPARATION OF THE MOULDING COMPOSITIONS ACCORDING TO THE INVENTION

Components A, B, C, E, F and, if appropriate, D were compounded on a twin-screw extruder (Werner und Pfleiderer) type ZSK 53 at a temperature of 240° C.

Shaped articles were produced on an injection-moulding machine at 260° C.

The burning properties of the samples were measured in accordance with UL-Subj. 94 V in test piece thicknesses of 1.6 mm. The UL-94 test is carried out as follows:

Samples of substance are shaped to bars having the dimensions 127×12.7×1.6 mm. The bars are mounted vertically so that the underside of the test piece is 305 mm above a strip of bandaging material. Each test bar is ignited individually by means of two successive ignition operations lasting 10 seconds, the burning properties are observed after each ignition operation and the sample is then evaluated. A Bunsen burner with a 10 mm (3/8 inch) high blue flame of natural gas with a heat check of $3.73 \times 10^4$ kJ/m$^3$ (1.000 BTU per cubic foot) is used to ignite the sample.

The UL-94 V-0 classification comprises the properties described below for materials which have been tested in accordance with the UL-94 specification. The polycarbonates in this class contain no samples which burn for longer than 10 seconds after each action of the test flame; they do not exhibit a total flaming time of more than 50 seconds when the flame is applied twice to each test batch; they contain no samples which burn completely up to the holding clamp fixed to the upper end of the sample; they contain no samples which, by producing burning drips or particles, ignite the cottonwool arranged below the sample; they also contain no samples which glow for longer than 30 seconds after the test flame has been removed.

Other UL-94 classifications designate samples which are less flame-repellent and self-extinguishing and produce flaming drips or particles. These classifications are UL-94 V-1 and V-2. F means "failed" and is the classification of samples which have an after-burn time of 30 seconds.

The surface of the shaped articles was evaluated visually in respect of surface defects, such as waviness, on test pieces having the dimensions $127 \times 12.7 \times 1.6$ mm or $60 \times 40 \times 2$ mm.

The precise composition of the moulding materials tested and the resulting test data can be seen from the following table.

component (D) can thus also be introduced via the high molecular weight polycarbonate according to component (A), the parts by weight being based on in each case 100 parts by weight of (A)+(B)+(C) and (D), which composition additionally contains (E) 1 to 15 parts by weight of a phosphorus compound of the formula (I)

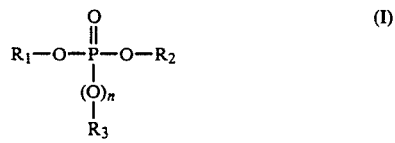

| | A 1 Parts by weight | A 2 Parts by weight | B Parts by weight | C Parts by weight | E 1 Parts by weight | E 2 Parts by weight | F 1 Parts by weight | F 2 Parts by weight | D Parts by weight | Nature of the surface | UL-94 (1.6 mm) |
|---|---|---|---|---|---|---|---|---|---|---|---|
| | | | | | Comparison experiments | | | | | | |
| V 1 | 70 | | 15 | 15 | 5 | | | | | no findings | f |
| V 2 | 70 | | 12 | 18 | | | | 0.15 | | waviness | f |
| V 3 | 70 | | 12 | 18 | 5 | | | 0.2 | | waviness | |
| V 4 | 70 | | 12 | 18 | | | 2.0 | | | no findings | f |
| V 5 | | 60 | 12 | 18 | | | 2.0 | | 10 | no findings | f |
| | | | | | Experiments according to the present invention | | | | | | |
| E 1 | 70 | | 12 | 18 | 5 | | 2.0 | | | no findings | VO |
| E 2 | 70 | | 12 | 18 | | 5 | 2.0 | | | no findings | VO |
| E 3 | | 60 | 12 | 18 | | 2 | 2.0 | | 10 | no findings | VO |

What is claimed is:

1. A process for preparing a thermoplastic moulding composition with flame repellant properties consisting of
   (A) 20 to 85 parts by weight of a thermoplastic aromatic polycarbonate,
   (B) 5 to 50 parts by weight of a graft polymer of
      (i) 5 to 90 parts by weight of a mixture of
         (a) 50 to 95% by weight of styrene, α-methylstyrene, nuclear-substituted styrene, methyl methacrylate or mixtures thereof and
         (b) 50 to 5% by weight of (meth)acrylonitrile, methyl methacrylate, maleic anhydride, N-substituted maleimide or mixtures thereof, on
      (ii) 95 to 10 parts by weight of a rubber with a glass transition temperature of 10° C. or less,
   (C) 5 to 70 parts by weight of a thermoplastic copolymer of
      (i) 50 to 95% by weight of styrene, α-methylstyrene, nuclear-substituted styrene, methyl methacrylate or mixtures thereof and
      (ii) 50 to 5% by weight of (meth)acrylonitrile, methyl methacrylate, maleic anhydride, N-substituted maleimide or mixtures thereof, and,
   (D) 3 to 15 parts by weight of a low molecular weight or high molecular weight halogen compound, wherein the halogen content resulting from components (A)+(D) is from 3% to 10% by weight, based on the total weight of components (A)+(D) and wherein the halogen content resulting from wherein
   $R_1$, $R_2$ and $R_3$ independently of one another are optionally halogenated $C_1$–$C_8$-alkyl or optionally halogenated $C_6$–$C_{20}$-aryl radicals, and n is 0 or 1, and
   (F) 0.05 to 1 part by weight of a tetrafluoroethylene polymer with an average particle size of 0.05 to 20 μm and a density of 1.2 to 1.9 g/cm³, with the parts by weight of components (E) and (F) in each case being based on 100 parts by weight of the sum of components (A)+(B)+(C) and (D),
   said process comprises preparing a (B)/(F) preblend which is a coagulated mixture of emulsions of the tetrafluoroethylene polymers (F) with a ratio of (B) to (F) of from 95:5 to 60:40 with emulsions of additional amounts of graft polymers (B) of 0.1 to 4 parts by weight, relative to 100 parts by weight of the sum of components (A)+(B)+(C) and (D), and thereafter the components (A), (B), (C), (D), (E), and preblended (F) are mixed and subjected to melt compounding or melt extrusion at a temperature from 200° C. to 330° C.

2. A process according to claim 1 wherein components (A), (B), (C), (D), (E) and (F) are mixed with at least one additive selected from the group consisting of stabilizers, pigments, flow control agents, mould release agents and antistatics.

* * * * *